United States Patent
Das et al.

(10) Patent No.: US 9,858,694 B1
(45) Date of Patent: Jan. 2, 2018

(54) METHODS AND SYSTEMS FOR ADAPTIVE STROKE THICKENING OF GRAPHICS OBJECTS

(71) Applicant: XEROX CORPORATION, Norwalk, CT (US)

(72) Inventors: Arindam Das, Konnagar (IN); Ranita Bej, Kolkata (IN); Xing Li, Webster, NY (US)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 15/406,817

(22) Filed: Jan. 16, 2017

(51) Int. Cl.
  *G09G 5/02* (2006.01)
  *G06T 11/40* (2006.01)
  *G06T 11/20* (2006.01)
  *G06T 11/00* (2006.01)

(52) U.S. Cl.
  CPC ............ *G06T 11/40* (2013.01); *G06T 11/001* (2013.01); *G06T 11/203* (2013.01)

(58) Field of Classification Search
  CPC ..... G06T 11/001; G06T 11/40; H04N 1/4092; G06F 3/1208
  USPC ......................................................... 345/589
  See application file for complete search history.

(56) References Cited

U.S. PATENT DOCUMENTS

| | | | | |
|---|---|---|---|---|
| 6,179,485 | B1* | 1/2001 | Harrington | H04N 1/40012 358/1.11 |
| 6,507,344 | B2* | 1/2003 | Kurumida | G06T 11/203 345/441 |
| 8,274,567 | B2* | 9/2012 | Raghoebardajal | G06T 11/203 348/207.1 |
| 2014/0313206 | A1* | 10/2014 | George | G06T 11/40 345/441 |

* cited by examiner

*Primary Examiner* — Thomas Lett

(57) ABSTRACT

Methods and devices to improve the quality of graphics objects based on adaptive stroke thickening are disclosed. The method includes receiving a graphics object having a stroke, where the stroke defines a fill region. The received graphics object is identified as a fill object based on the stroke including a first cell of a stroke color being different from a fill color of a second cell associated with the fill region. The stroke color and the fill color are compared with a background color of a third cell associated with a background according to a predefined condition, where the first cell, the second cell, and the third cell are linearly adjacent to each other. Based on the comparison, an adapted color being different from the background color of the third cell is selected to adaptively strengthen the first cell, which is associated with the stroke, away from the fill region.

49 Claims, 12 Drawing Sheets

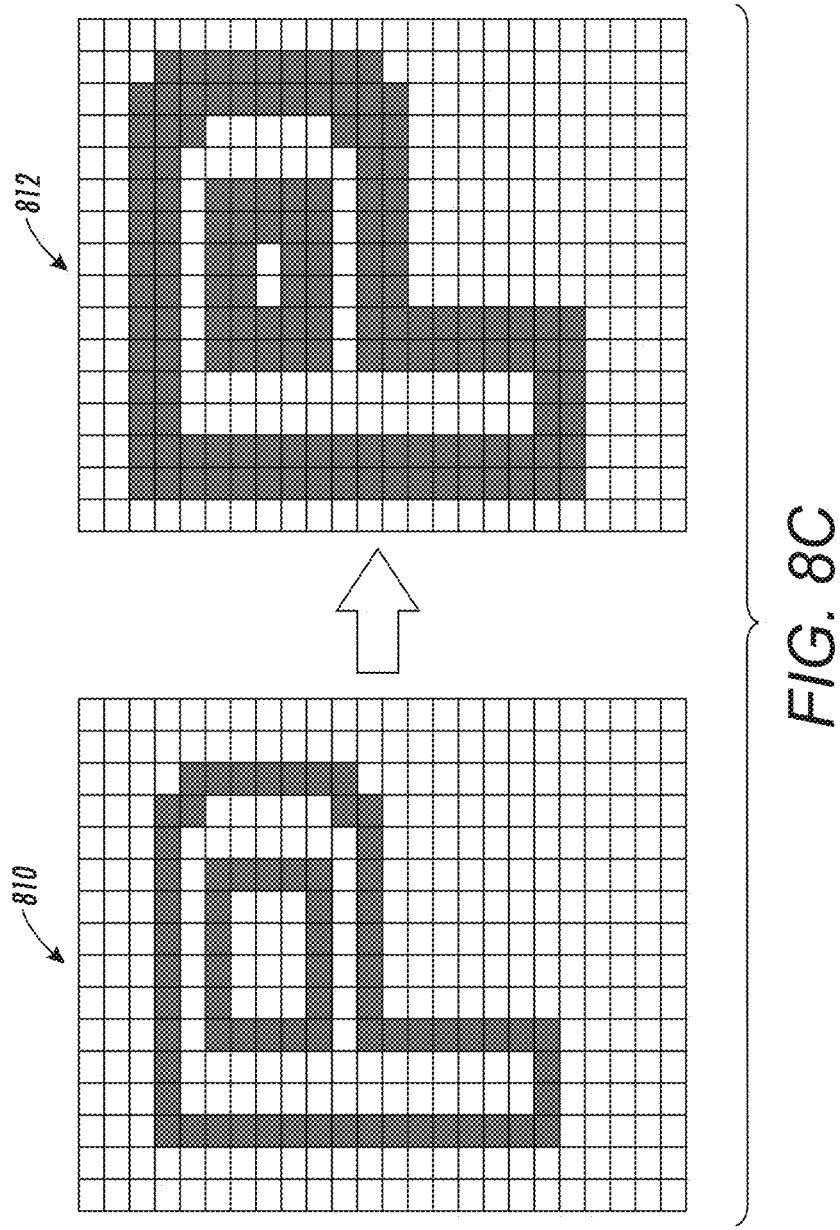

METHODS AND SYSTEMS FOR ADAPTIVE STROKE THICKENING OF GRAPHICS OBJECTS

TECHNICAL FIELD

The presently disclosed embodiments relate to refining of computer graphics, and more particularly, to systems and methods for adaptive stroke thickening of graphics objects.

BACKGROUND

Advances in the field of computer graphics have revolutionized the digital space and have added convenience and finesse to the modern print technologies. Elements in the digital space are produced either as image-based graphics or object-based graphics for printing. The image-based (or raster) graphics use raster objects that measure various aspects, for example, hue, saturation, and intensity that describe color at predetermined set of locations, i.e., a grid of pixels, to represent an image. In contrast, the object-based graphics represent an image using graphics objects made up of primitive or geometric entities such as lines, polygons, circles, Bezier curves, and so on. Each graphics object is based on vectors that extend through control points or nodes, which have a definite location on a two-dimensional plane and determine the direction of a path followed by the graphics object. The path, and so the corresponding graphics object, has various attributes such as stroke, outline (or border), color, shape, curve, thickness, and fill.

Each graphics object is made up of one or more strokes that define a curve representing the shape of the graphics object. Such curve may form an outline, or a part thereof, that interfaces between the graphics object and the background. The outline can define one or more enclosed regions called as fill regions to create a fill graphics object (or just, fill object), where the outline may have a color different from fill colors of one or more enclosed regions.

Unlike the raster objects, the graphics objects can be layered, dynamically sized with changing device resolutions, and occupy relatively less memory. As a result, the graphics objects are a preferred choice to represent logos, fonts, illustrations, etc., in a high production imaging environment such as a heterogeneous printer workflow environment (e.g., FreeFlow® Print Server), where the image quality holds supreme importance. However, conventional approaches may fail to improve the image quality of graphics objects, especially the fill objects.

State-of-the-art approaches such as region growing algorithms, which are based on stroke thickening, may cause fill objects having light strokes such as thin curves to fade out or disappear. For example, when a fill object has a color (e.g., white) of the outline different than a fill color (e.g., black), but same as the background color (i.e., white), the existing approaches may cause the fill object to fade out while growing or thickening the outline. Moreover such stroke thickening techniques often grow or thicken the outline to overlap a fill region, or a part thereof, of the fill object and can cause the fill color to get replaced by the color of the outline. As a result, an original appearance of the fill object may change, especially when the fill object has a thin fill region. Such content loss and appearance variation (or content distortion) in the fill objects results in a degraded image quality output and hampers production performance.

Therefore, there exists a need for a robust technique that improves the quality of graphics objects, particularly fill objects, without any loss of data or content.

SUMMARY

One embodiment of the present disclosure includes a computer-implemented method for adaptive stroke thickening of graphics objects. The method includes receiving a graphics object having at least one stroke that defines a fill region. Both the at least one stroke and the fill region are represented by a group of cells. The graphics object is represented within an object window made up of a plurality of cells. The received graphics object is identified as a fill object based on the at least one stroke including a first cell of a stroke color being different from a fill color of a second cell associated with the fill region. The first cell and the second cell belong to the group of cells and are linearly adjacent to each other. The stroke color of the first cell and the fill color of the second cell are compared with a background color of a third cell associated with a background according to at least one predefined condition. The third cell belongs to the plurality of cells based on the background being a part of the object window and is linearly adjacent to the first cell and the second cell. An adapted color being different from the background color of the third cell is selected based on the comparison. The first cell associated with the at least one stroke is adaptively strengthened based on the adapted color.

Another embodiment of the present disclosure includes a device for adaptive stroke thickening of graphics objects. The device includes an input module, an adaptation module, and an adaptive stroke strengthening module. The input module is on a computer having a memory and a processor and configured to receive a graphics object having at least one stroke that defines a fill region. The at least one stroke and the fill region are represented by a group of cells. The graphics object is represented within an object window made up of multiple cells. The input module is further configured to identify the received graphics object as a fill object based on the at least one stroke including a first cell of a stroke color being different from a fill color of a second cell associated with the fill region. The first cell and the second cell belong to the group of cells and are linearly adjacent to each other. The adaptation module on the computer is configured to compare the stroke color of the first cell and the fill color of the second cell with a background color of a third cell associated with a background according to at least one predefined condition. The third cell belongs to those multiple cells based on the background being a part of the object window and is linearly adjacent to the first cell and the second cell. The adaptation module is also configured to select an adapted color being different from the background color of the third cell based on the comparison. The adaptive stroke strengthening module on the computer is configured to adaptively strengthen the first cell associated with the at least one stroke based on the adapted color.

Yet another embodiment of the present disclosure includes a non-transitory computer-readable medium comprising computer-executable instructions for adaptive stroke thickening of graphics objects. The non-transitory computer-readable medium comprising instructions for receiving a graphics object having at least one stroke that defines a fill region. Both the at least one stroke and the fill region are represented by a group of cells. The graphics object is represented within an object window made up of multiple cells. The non-transitory computer-readable medium also includes instructions for identifying the received graphics object as a fill object based on the at least one stroke including a first cell of a stroke color being different from a fill color of a second cell associated with the fill region. The first cell and the second cell belong to the group of cells and are linearly adjacent to each other. The non-transitory computer-readable medium further includes instructions for comparing the stroke color of the first cell and the fill color of the second cell with a background color of a third cell associated with a background according to at least one predefined condition. The third cell belongs to those multiple cells based on the background being a part of the object window and is linearly adjacent to the first cell and the second cell. The non-transitory computer-readable medium additionally includes instructions for selecting an adapted color being different from the background color of the third cell based on the comparison, followed by adaptively strengthening the first cell associated with the at least one stroke based on the adapted color.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

FIGS. 8A, 8B, 8C are schematics of typical graphics objects and corresponding enhanced outputs of those graphics objects produced by the AST device of FIGS. 1-5, according to an embodiment of the present disclosure.

DESCRIPTION

Figure 1:
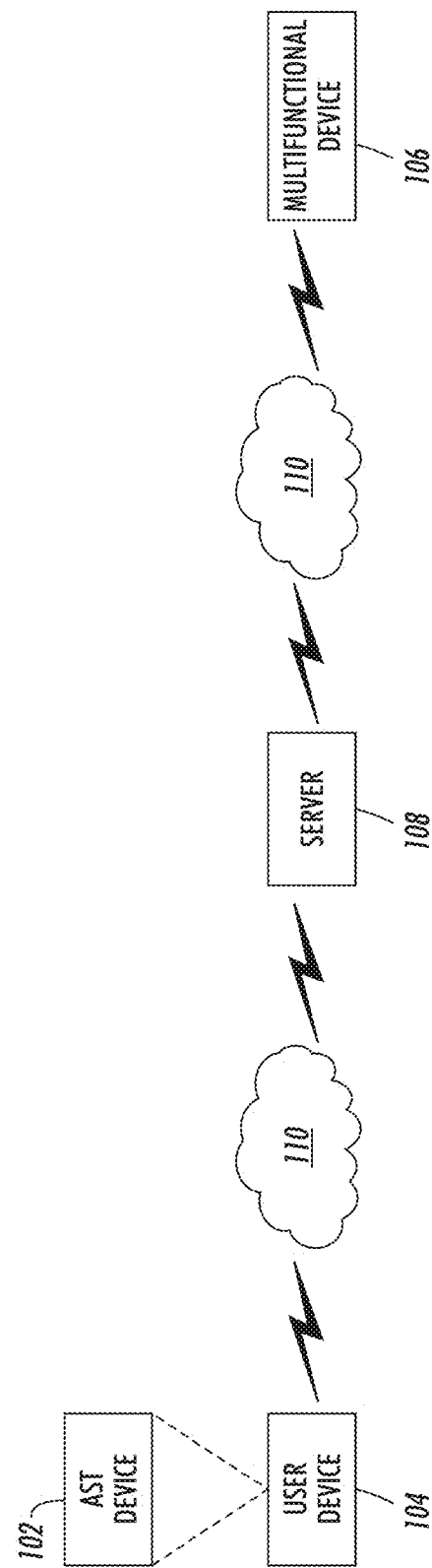
FIGS. 1-5 are schematics of network environments including an exemplary adaptive stroke thickening (AST) device, according to various embodiments of the present disclosure.

The following detailed description is provided with reference to the figures. Exemplary, and in some cases preferred, embodiments are described to illustrate the disclosure, not to limit its scope, which is defined by the claims. Those of ordinary skill in the art will recognize a number of equivalent variations in the description that follows without departing from the scope and spirit of the disclosure.

Non-Limiting Definitions

Definitions of one or more terms that will be used in this disclosure are described below without limitations. For a person skilled in the art, it is understood that the definitions are provided just for the sake of clarity, and are intended to include more examples than just provided below.

A "graphics object" is used in the present disclosure in the context of its broadest definition. The graphics object refers to a hierarchic aggregation of one or more primitive geometric objects (e.g., lines, polygons, circles, Bezier curves, etc.) defined by a series of control points that are joined to form a curve. The graphics object may represent an electronic display element that is characterized by color and shape of the primitive geometric objects (PGOs). The graphics object has various attributes such as shape, stroke (e.g., an outline or border), fill, and color.

A "curve" is used in the present disclosure in the context of its broadest definition. The curve refers to a straight or curved contiguous procession of pixels or cells within an object window such as an image, a document, a display screen, and a virtual/electronic window, or any combination thereof. In some embodiments, the curve may refer to sharp structures, which include pixels or cells, such as solid color strokes forming a straight line. The curve may be a thin curve or an inverse curve.

A "thin curve" is used in the present disclosure in the context of its broadest definition. The thin curve refers to a curve having a width of about two pixels or less, depending on an image resolution. It may be defined by a sharp structure comprising active pixels, such as solid color strokes including straight lines. The thin curve may be of any shape (e.g., linear, curved or free-flowing, etc.) or orientation (e.g., horizontal, vertical, slanted or angled, etc.) with respect to (1) the background or (2) orientations of print media.

An "inverse curve" is used in the present disclosure in the context of its broadest definition. The inverse curve refers to a curve comprising inactive pixels (e.g., white pixels) on active pixels (e.g., black or any color pixels).

A "stroke" is used in the present disclosure in the context of its broadest definition. The stroke refers to a locus of points (e.g., pixels) between two control points of the graphics object. Each point represents stroke data and is defined by coordinates in a two-dimensional (2D) or a three-dimensional (3D) plane. For example, a character "A" has a shape defined by at least three strokes, i.e., "/", "\" and "-".

An "outline" is used in the present disclosure in the context of its broadest definition. The outline refers to a set of one or more strokes that interfaces between a fill region of the graphics object and a relative background. In some embodiments, the outline may define or be a part of one or more fill regions. The color of the outline may be different from that of the fill regions.

A "fill" and "fill region" are used interchangeably in the present disclosure in the context of their broadest definition. The fill refers to a closed region defined by the outline of the graphics object. The closed region may be filled with a color, a color gradient, or a pattern. The color gradient is a transition among several colors at set distances and may be either linear or radial.

A "fill graphics object" is used in the present disclosure in the context of its broadest definition. The fill graphics object refers to a graphics object having the fill region, where the color of an outline may be different from that of the fill region.

A "background region" and "background" are used interchangeably in the present disclosure in the context of its broadest definition. The background refers to an ambient region in communication with the outline of the graphics object. The background may be represented by one or more pixels or cells.

A "file" is used in the present disclosure in the context of its broadest definition. The file refers to a computer readable, electronic file and related data in a variety of formats supporting storage, printing, or transfer of the file and related data over a communication channel. The file may be capable of being editable or non-editable, encrypted or decrypted, coded or decoded, compressed or decompressed, and convertible or non-convertible into different file formats and storage schemas, or any combination thereof. The file may be capable of being used by software applications to execute predetermined tasks or jobs.

A "document" is used in the present disclosure in the context of its broadest definition. The document refers to an electronic document including a single page or multiple pages. Each page may have text, graphics objects, images, embedded audios, embedded videos, embedded data files, or any combination thereof. The document may be a type of file.

A "user" is used in the present disclosure in the context of its broadest definition. The user refers to a person, an artificial intelligence unit, or any other entity, which communicates with one or more modules loaded or integrated with an electronic device capable of or configured to perform a specific function. The entity may include organizations such as professional services organizations, product manufacturing organizations, finance management organizations, real estate organizations, and so on that deal with one or more documents or image graphics.

A "user device" is used in the present disclosure in the context of its broadest definition. The user device refers to a standalone or a networked computing device capable of handling electronic images, and may host various applications to request services from other devices connected to a network. Various examples of the user device include a desktop PC, a personal digital assistant (PDA), a mobile computing device (for e.g., mobile phones, laptops, tablets, etc.), a server, an Internet-of-things (IOT) device, an artificial intelligence system, etc.

A "multifunctional device" is used in the present disclosure in the context of its broadest definition. The multifunctional device refers to a computing device that incorporates multiple functionalities including, without limitation, printing, scanning, copying, and faxing in a single device. The multifunctional device may perform and facilitate these functionalities as a service to network devices. The multifunctional device may operate as a standalone device or as a peripheral device to network devices.

A "workflow" is used in the present disclosure in the context of its broadest definition. The workflow refers to a set of activities performed by the user independently or in association with one or more computing devices to avail, customize, or offer modification of a graphics object as a service.

A "strengthening" is used in the present disclosure in the context of its broadest definition. "Strengthening" refers to an increase in the number of adjoining cells or pixels having a predefined color in the neighborhood of a reference cell or pixel.

A "thickening" is used in the present disclosure in the context of its broadest definition. The "thickening" refers to the strengthening being performed with the adjoining cells or pixels having a color that is same as the color of the reference cell or pixel.

An "image" and an "electronic image" are used interchangeably in the present disclosure in the context of their broadest definition. The image refers to a visual representation of electronic data such as raster objects, graphics objects, text, voice, and metadata (e.g., digital signatures, computer instructions, file path, user information, etc.) or any combination thereof. In some embodiments, the image may embed another image.

A "flag" or "tag" are used interchangeably in the present disclosure in the context of their broadest definition. The "flag" refers to an identifier that indicates an intended region (e.g., the fill region) in communication with the graphics object or any attributes thereof. Examples of the flag may include, but not limited to, a text, a graphic, a symbol, a numeric or alphanumeric value, a predefined function, and a color, or any combination thereof.

The numerous references in the disclosure to an adaptive stroke thickening (AST) device are intended to cover any and/or all devices capable of performing respective operations on graphics objects in a multi-printer environment relevant to the applicable context, regardless of whether or not the same are specifically provided.

Overview

Various embodiments of the present disclosure describe systems and methods for adaptive stroke thickening of graphics objects. The embodiments include an adaptive stroke thickening (AST) device that provides a robust solution to improve existing techniques to enhance the quality of graphics objects. The AST device receives a graphics object having a stroke that defines a fill region. Such graphics object is identified as a fill object by the AST device provided a color of the stroke is different from that of the fill region. The AST device compares a stroke color and a fill color of the fill region with a background color to select an appropriate color for an adaptive stroke thickening. The AST device handles different combinations of fill color, background color and stroke color, which may be a color of an outline of the graphics object, without any adverse impact on the system performance, and is independent of the image path architecture in a print production environment. In the present context, a system refers to the AST device or a combination of the AST device with peripherals or network devices. Further, the AST device provides flexibility to a user to select a color from a predefined range of colors to implement stroke strengthening. Alternatively or additionally, the AST device may implement a unidirectional stroke thickening, which may be performed away from the fill region. The AST device provides a simple but effective technique that prevents major issues of content loss and appearance variation (or content distortion) while strengthening the graphics objects such as fill objects.

Exemplary Embodiments

FIGS. 1-5 are schematics of network environments including an exemplary adaptive stroke thickening (AST) device 102, according to various embodiments of the present disclosure. Embodiments are discussed in the context of a print workflow environment, where graphics objects may be manipulated for printing. However, in general, the embodiments may be implemented in any image production environment including a computing device operating as a standalone device or in communication with network devices to improve the quality of graphics objects.

The illustrated embodiments (FIGS. 1-5) include a user device 104 in communication with a multifunctional device 106 via a server 108 over a network 110. The network 110 may include any software, hardware, or computer applications that can provide a medium to exchange signals or data in any of the formats known in the art, related art, or developed later. The network 110 may include, but is not limited to, social media platforms implemented as a website, a unified communication application, or a standalone application. Examples of the social media platforms may include, but are not limited to, Twitter™, Facebook™, Skype™, Microsoft Lync™, Cisco Webex™, and Google Hangouts™. Further, the network 110 may include, for example, one or more of the Internet, Wide Area Networks (WANs), Local Area Networks (LANs), analog or digital wired and wireless telephone Networks (e.g., a PSTN, Integrated Services Digital Network (ISDN), a cellular network, and Digital Subscriber Line (xDSL), Wi-Fi, radio, television, cable, satellite, and/or any other delivery or tunneling mechanism for carrying data. The network 110 may include multiple networks or sub-networks, each of which may include, for example, a wired or wireless data pathway. The network 110 may include a circuit-switched voice network, a packet-switched data network, or any other network able to carry electronic communications. For example, the network 110 may include networks based on the Internet protocol (IP) or asynchronous transfer mode (ATM), and may support voice using, for example, VoIP, Voice-over-ATM, or other comparable protocols used for voice, video, and data communications.

In a first exemplary embodiment (FIG. 1), the AST device 102 may be installed on, integrated, or operated with the user device 104. The user device 104 may be any computing device known in the art, related art, or developed later, which may be operable by a user. The AST device 102 may be preconfigured or dynamically configured to, at least one of, (1) communicate synchronously or asynchronously with one or more software applications, databases, storage devices, or appliances operating via same or different communication protocols, formats, database schemas, platforms or any combination thereof, to receive and send graphics objects; (2) collect, store, and analyze graphics objects; (3) formulate one or more tasks for being performed on or trained from the graphics objects; (4) provide, execute, communicate, and assist in formulating one or more mathematical models for tasks related to recognition, identification, manipulation, and presentation of the graphics objects; (5) parse a file into constituting components, for example, text, raster objects, digital signatures, embedded files, graphics objects, etc.; (6) identify graphics objects that are fill objects; (7) convert the graphics objects into raster images, and vice versa; (8) determine various attributes (e.g., strokes, stroke color, stroke width, fill regions, fill color, background, background color, etc.) of the graphics objects; (9) manipulate the graphics object based on adaptive stroke thickening using an adapted color in conjunction with state-of-the-art image enhancement techniques; (10) perform a unidirectional stroke thickening on the graphics object with or without the adaptive stroke thickening based on the adapted color; (11) display, print, or communicate the manipulated graphics objects; and (12) transfer or map the models, tasks, attributes, attribute values, and manipulation data, or any combination thereof to one or more networked computing devices and/or data repositories.

The AST device 102 may represent any of a wide variety of devices capable of providing adaptive stroke thickening services to the network devices for manipulation of graphics objects. Alternatively, the AST device 102 may be implemented as a software application or a device driver. The AST device 102 may enhance or increase the functionality and/or capacity of the network, such as the network 110, to which it is connected. In some embodiments, the AST device 102 may be also configured, for example, to perform e-mail tasks, security tasks, network management tasks including Internet protocol (IP) address management, and other tasks. In some other embodiments, the AST device 102 may be further configured to expose its computing environment or operating code to a user, and may include related art I/O devices, such as a keyboard or display. The AST device 102 of some embodiments may, however, include software, firmware, or other resources that support the remote administration and/or maintenance of the AST device 102.

In further embodiments, the AST device 102 is either in communication with any of the networked devices such as the user device 104, or dedicatedly, may have video, voice, or data communication capabilities (e.g., unified communication capabilities) by being coupled to or including, various imaging devices (e.g., cameras, printers, scanners, medical imaging systems, etc.), various audio devices (e.g., microphones, music players, recorders, audio input devices, speakers, audio output devices, telephones, speaker telephones, etc.), various video devices (e.g., monitors, projectors, displays or display screens, televisions, video output devices, video input devices, camcorders, etc.), or any other type of hardware, in any combination thereof. In some embodiments, the AST device 102 may comprise or implement one or more real time protocols (e.g., session initiation protocol (SIP), H.261, H.263, H.264, H.323, etc.) and non-real-time protocols known in the art, related art, or developed later to facilitate data transfer between the user device 104, the multifunctional device 106, the server 108, and the AST device 102, or any other network device.

In some embodiments, the AST device 102 may be configured to convert communications, which may include instructions, queries, data, files, etc., from the user device 104 and the server 108 into appropriate formats to make these communications compatible with the multifunctional device 106, and vice versa. Consequently, the AST device 102 may allow implementation of the multifunctional device 106 using different technologies or by different organizations, for example, a third-party vendor, managing the multifunctional device 106 or associated services using a proprietary technology.

In a second embodiment (FIG. 2), the AST device 102 may be preconfigured or dynamically configured to interact with the multifunctional device 106 via the server 108 over the network 110. The AST device 102 may be installed on, integrated, or operatively associated with the server 108. The server 108 may be implemented as any of a variety of computing devices including, for example, a general purpose computing device, multiple networked servers (arranged in clusters or as a server farm), a mainframe, or so forth.

In a third embodiment (FIG. 3), the AST device 102 may be integrated, installed on, or operated with the multifunctional device 106, which may refer to a computing device that incorporates multiple functionalities including, without limitation, printing, scanning, copying, and faxing in a single device. The multifunctional device 106 may perform and provide these functionalities as a service to network devices such as the user device 104 in a multi-user environment for performing various operations. Examples of these operations may include print job management, copying or printing files, physical document scans, graphics object manipulation, document or data encryption and decryption, embedding of digital signatures, sending or receiving emails, and so on. The multifunctional device 106 may operate as a standalone device or as a peripheral device to network devices such as the user device 104.

Figure 2:
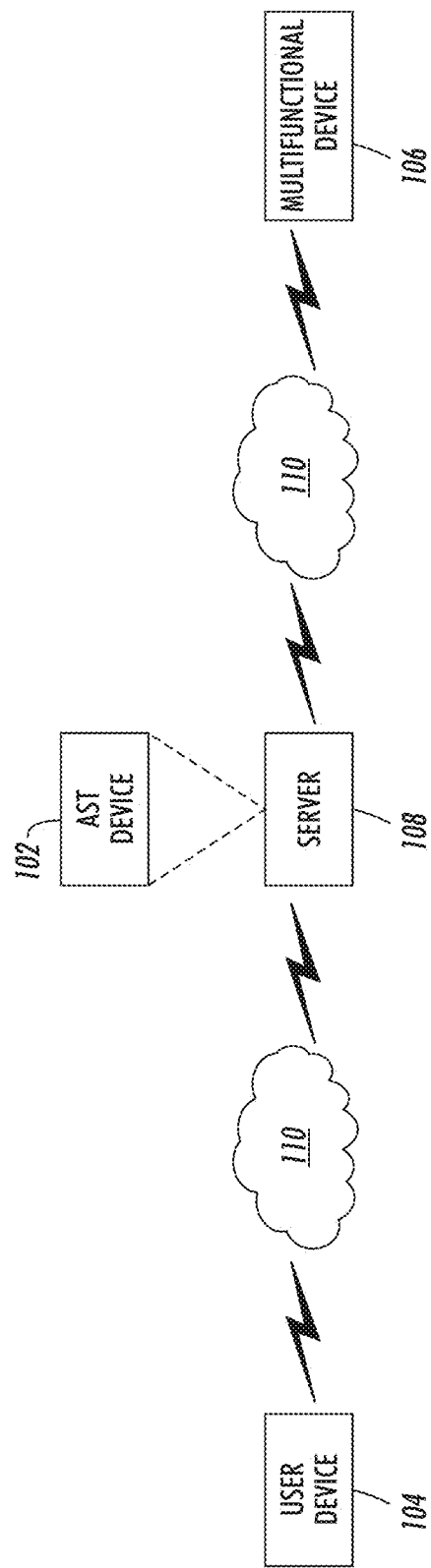
Figure 3:
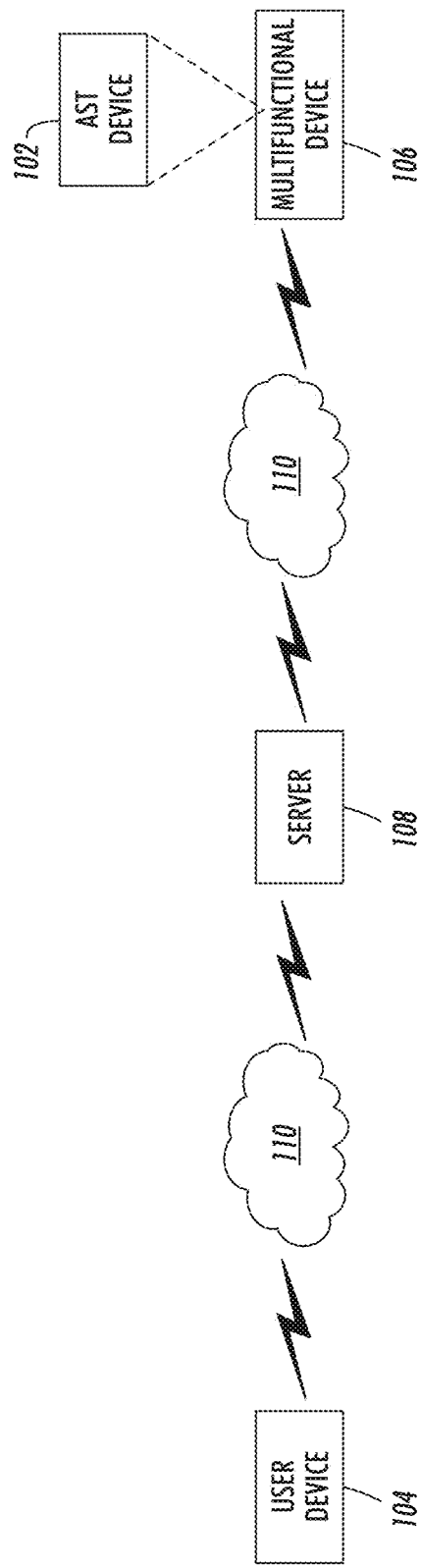
Figure 4:
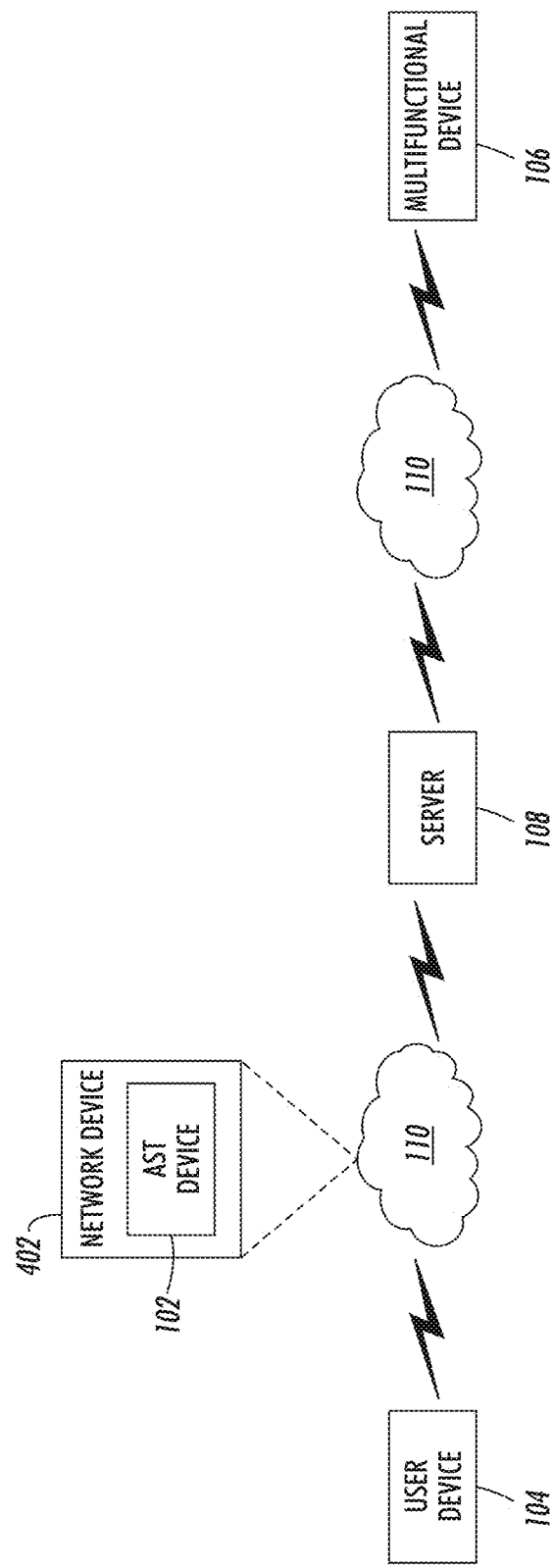

In a fourth embodiment (FIG. 4), the AST device 102 may be integrated, installed on or operated with a network appliance 402 configured to establish the network 110 among the user device 104, the server 108, and the multifunctional device 106. One of the AST device 102 and the network appliance 402 may be capable of operating as or providing an interface to assist the exchange of software instructions and data among the user device 104, the server 108, and the multifunctional device 106. In some embodiments, the network appliance 402 may be preconfigured or dynamically configured to include the AST device 102 integrated with other devices. For example, the AST device 102 may be integrated with the server 108 (as shown in FIG. 2) or any other computing device connected to the network 110. The server 108 may include a module (not shown), which enables the server 108 being introduced to the network appliance 402, thereby enabling the network appliance 402 to invoke the AST device 102 as a service. Examples of the network appliance 402 include, but are not limited to, a DSL modem, a wireless access point, a router, a base station, and a gateway having a predetermined computing power and memory capacity sufficient for implementing the AST device 102.

Figure 5:
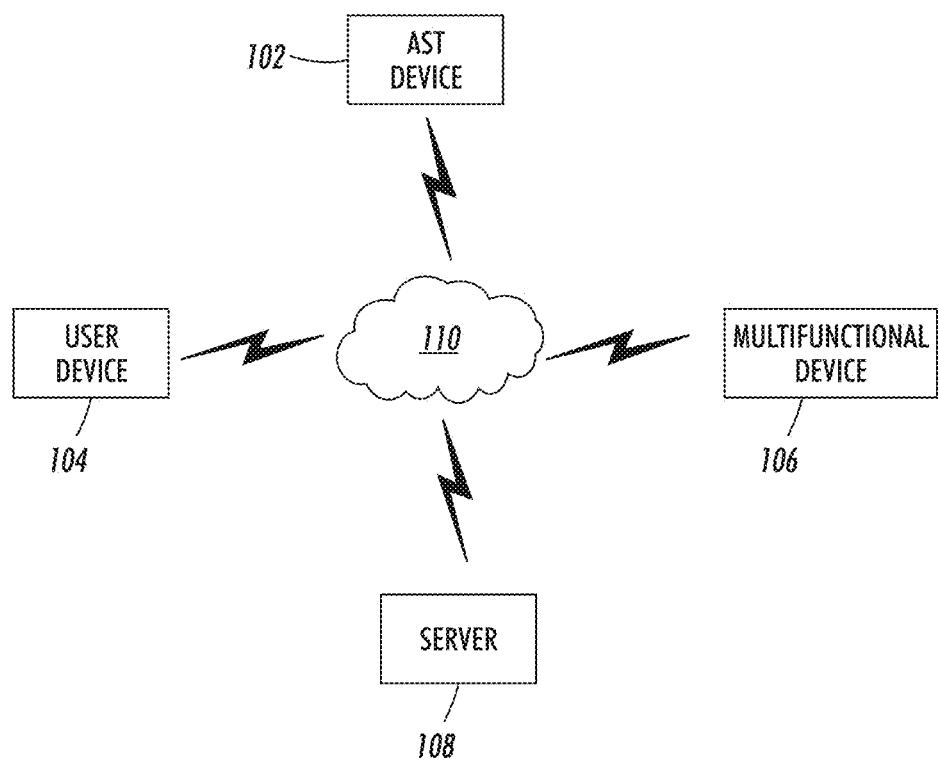

In a fifth embodiment (FIG. 5), the AST device 102 may operate as a standalone device. The AST device 102 may include its own processor(s) 602 (shown in FIG. 6) and a transmitter and receiver (TxRx) unit (not shown). In the embodiment of FIG. 5, the user device 104, the server 108, the multifunctional device 106, and the AST device 102 may be implemented as dedicated devices communicating with each other over the network 110. Accordingly, the AST device 102 may communicate directly with the networked devices, e.g., the user device 104, the server 108, the multifunctional device 106, etc. using the TxRx unit.

Figure 6:
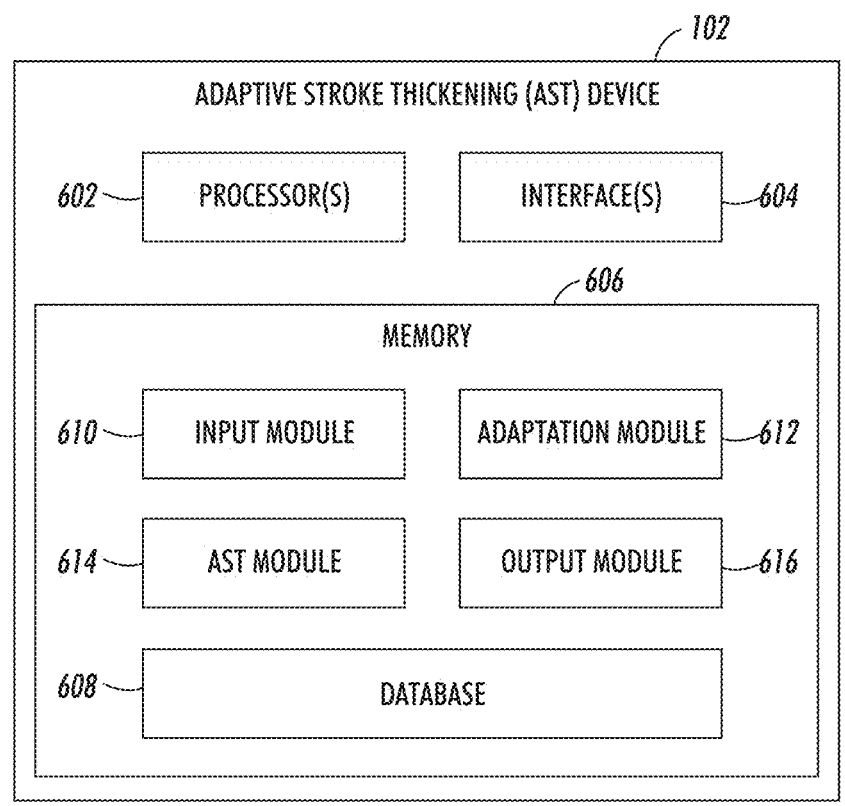
FIG. 6 is a schematic that illustrates the exemplary AST device of FIGS. 1-5, according to an embodiment of the present disclosure.

FIG. 6 is a schematic that illustrates the exemplary AST device 102 of FIGS. 1-5, according to an embodiment of the present disclosure. The AST device 102 may be implemented by way of a single device (e.g., a computing device, a processor or an electronic storage device) or a combination of multiple devices that are operatively connected or networked together. The AST device 102 may be implemented in hardware or a suitable combination of hardware and software. In some embodiments, the AST device 102 may be a hardware device including processor(s) 602 executing machine readable program instructions to (1) communicate synchronously or asynchronously with one or more software applications, databases, storage devices, or appliances operating via same or different communication protocols, formats, database schemas, platforms or any combination thereof, to receive and send graphics objects; (2) collect, store, and analyze graphics objects; (3) formulate one or more tasks for being performed on or trained from the graphics objects; (4) provide, execute, communicate, and assist in formulating one or more mathematical models for tasks related to recognition, identification, manipulation, and presentation of the graphics objects; (5) parse a file into constituting components, for example, text, raster objects, digital signatures, embedded files, graphics objects, etc.; (6) identify graphics objects that are fill objects; (7) convert the graphics objects into raster images, and vice versa; (8) determine various attributes (e.g., strokes, stroke color, stroke width, fill regions, fill color, background, background color, etc.) of the graphics objects; (9) manipulate the graphics object based on adaptive stroke thickening using an adapted color in conjunction with state-of-the-art image enhancement techniques; (10) perform a unidirectional stroke thickening on the graphics object with or without the adaptive stroke thickening based on the adapted color; (11) display, print, or communicate the manipulated graphics objects; and (12) transfer or map the models, tasks, attributes, attribute values, and manipulation data, or any combination thereof to one or more networked computing devices and/or data repositories.

The "hardware" may comprise a combination of discrete components, an integrated circuit, an application-specific integrated circuit, a field programmable gate array, a digital signal processor, or other suitable hardware. The "software" may comprise one or more objects, agents, threads, lines of code, subroutines, separate software applications, two or more lines of code or other suitable software structures operating in one or more software applications or on one or more processors. The processor(s) 602 may include, for example, microprocessors, microcomputers, microcontrollers, digital signal processors, central processing units, state machines, logic circuits, and/or any devices that manipulate signals based on operational instructions. Among other capabilities, the processor(s) 602 may be configured to fetch and execute computer readable instructions in a dedicated or shared memory associated with the AST device 102 for performing tasks such as signal coding, data processing input/output processing, power control, and/or other functions.

In some embodiments, the AST device 102 may include, in whole or in part, a software application working alone or in conjunction with one or more hardware resources. Such software applications may be executed by the processor(s) 602 on different hardware platforms or emulated in a virtual environment. Aspects of the AST device 102 may leverage known, related art, or later developed off-the-shelf software. Other embodiments may comprise the AST device 102 being integrated or in communication with a mobile switching center, network gateway system, Internet access node, application server, IMS core, service node, or any other type of communication systems, including any combination thereof. In some embodiments, the AST device 102 may be integrated with or implemented as a wearable device including, but not limited to, a fashion accessory (e.g., a wristband, a ring, etc.), a utility device (a hand-held baton, a pen, an umbrella, a watch, etc.), a body clothing, and a safety gear, or any combination thereof.

The AST device 102 also includes a variety of known, related art, or later developed interface(s) 604 including software interfaces (e.g., an application programming interface, a graphical user interface, etc.); hardware interfaces (e.g., cable connectors, a keyboard, a card reader, a barcode reader, a radio frequency identity (RFID) reader, a biometric scanner, an RFID scanner, an interactive display screen, a transmitter circuit, a receiver circuit, etc.); or both.

The AST device 102 further includes a memory 606 for storing, at least one of: (1) files and related data including metadata, for example, data size, data format, creation date, associated tags or labels, related images, documents, messages or conversations, graphics objects (GOs), GO attributes and their values, etc.; (2) a log of profiles of network devices and associated communications including instructions, queries, conversations, data, and related metadata; and (3) predefined or dynamically defined or calculated mathematical models, equations, or methods for adaptive stroke thickening of graphics objects.

The memory 606 may comprise of any computer-readable medium known in the art, related art, or developed later including, for example, a processor or multiple processors operatively connected together, volatile memory (e.g., RAM), non-volatile memory (e.g., flash, etc.), disk drive, etc., or any combination thereof. The memory 606 may include one or more databases such as a database 608, which may be sub-divided into further databases for storing electronic files. The memory 606 may have one of many database schemas known in the art, related art, or developed later for storing the data, predefined or dynamically defined models, and parameter values. For example, the database 608 may have a relational database schema involving a primary key attribute and one or more secondary attributes. In some embodiments, the AST device 102 may perform one or more operations including, but not limited to, reading, writing, deleting, indexing, segmenting, labeling, updating, and modifying the data, or a combination thereof, and may communicate the resultant data to various networked computing devices. In one embodiment, the memory 606 includes various modules such as an input module 610, an adaptation module 612, an adaptive stroke thickening (AST) module 614, and an output module 616.

Input Module

In one embodiment, the input module 610 is preconfigured or dynamically configured to receive graphics objects defined in various page description language (PDL) files and document formats such as Adobe® Postscript®, Scalable Vector Graphics (SVG), and DOCX. The graphics objects are made up of various primitive geometric objects (e.g., lines, circles, polygons, Bezier curves, etc.) being represented as data structures arranged in a hierarchical order. Each primitive geometric object (PGO) may be formed by successive joining of control points or data points, which originate from a root, for example, zero coordinates, in a 2D or 3D plane. The PGO may be addressed by a pointer to control visual display. Further, the graphics objects have various attributes and may be constructed or represented within an object window. Examples of the attributes may include, but not limited to, shape, line style, fill pattern, and color. The object window may refer to an image, a document, a display screen, or a virtual/electronic window, or any combination thereof. The object window is made up of a matrix of data cells, hereinafter referred to as cells, each representing a smallest unit of the object window. These cells may resemble, correspond to, or associate with pixels in some embodiments. Other embodiments may include the object window being integrated with the graphics object.

Figure 7:
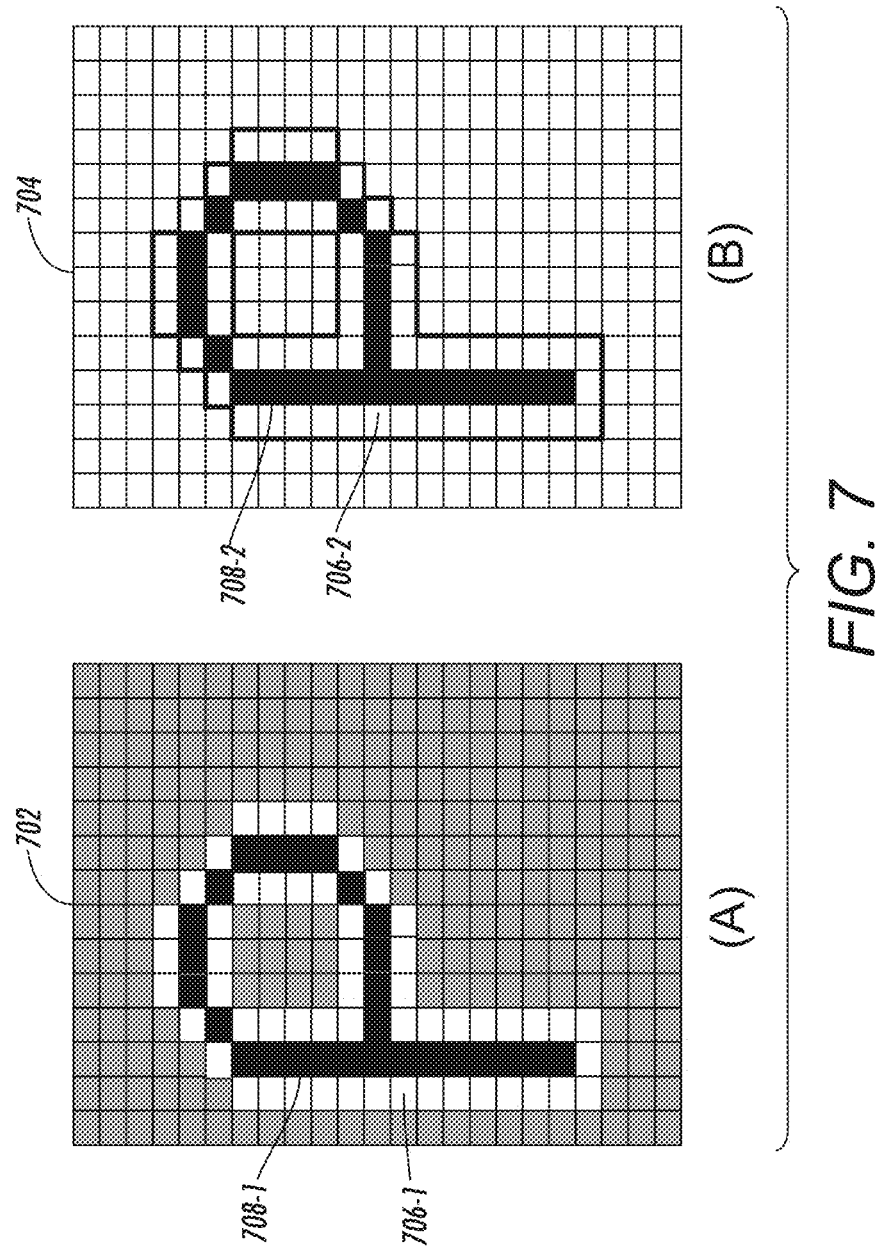
FIG. 7 is a schematic of typical graphics objects for being enhanced by the AST device of FIGS. 1-5, according to an embodiment of the present disclosure.

Examples of graphics objects are illustrated in FIG. 7. The figure illustrates a graphics object A and a graphics object B, each including an object window and having different values of the attributes. The graphics object A represents a character "P" within an object window 702 having a number of cells, which may resemble pixels in a raster image, a document, a display screen, or a virtual/electronic window. Similarly, the graphics object B represents a character "P" within an object window 704 having multiple cells, which may also resemble pixels in a raster image, a document, a display screen, or a virtual/electronic window. The character "P" is defined on a cell layout using a stroke and a fill (or fill region). One having ordinary skill in the art would understand that the character "P" can be defined by a variety of attributes known in the art, related art, or developed later for graphics objects, however, only stroke and fill are discussed here for the sake of simplicity and relevance. Moreover, the graphics objects A and B are not shown with control points to limit the discussion of non-inventive concepts. As shown, the graphics object A includes a stroke 706-1 that defines an outline or border of the character "P" and is represented by cells, hereinafter referred to as stroke cells, having a white color.

The stroke 706-1 is one pixel wide and extends to define an enclosed region called fill 708-1 (or fill region 708-1), which may be represented by cells, hereinafter referred to as fill cells, having a black color. In some embodiments, each cell of the graphics objects A and B may be a PGO or a control point, or both.

Further, as illustrated, the stroke 706-1 may communicate with an ambient region away from the fill region 708-1 within the object window 702, where the ambient region may be represented by cells, hereafter referred to as background cells, having a gray color in the graphics object A. The ambient region may represent a background with respect to a graphics object, such as the graphics objects A, within the object window 702. However, in some embodiments, the background may be outside the object window 702 relative to the graphics object A. Similar to the graphics object A, the graphics object B represents a character "P" made by a stroke 706-2 having a white color and defining a fill region 708-2 being represented by black cells. The stroke 706-2 defines an outline of the character "P" and is represented by stroke cells having a white color in the graphics object B. The stroke 706-2 is one pixel wide and extends along the fill region 708-2 while enclosing the fill region 708-2. Since the stroke color and the background color are same, i.e., white color, there is no visible demarcation between the stroke 706-2 and the background in the graphics object B. In such scenarios that exhibit attribute status similar to the graphics object B, where (1) a graphics object has the stroke or the fill being thin, i.e., two-pixel wide or less, and (2) there is no demarcation between the stroke color and the background color, the conventional approaches for stroke strengthening may cause the graphics object such as the graphics object B to fade out or disappear.

In some embodiments, the object windows 702 and 704 of FIG. 7 may be made up of a grid of pixels such that a pixel may associate with an overlapping cell of the graphics objects A and B, respectively. This may cause each cell of the graphics objects A and B to represent a color of an associated pixel if the graphics objects A and B have transparent or empty cells. Other embodiments may include graphics objects being drawn by a user on an electronic surface (not shown) in communication with the AST device 102 using an input device such as an electronic stylus (not shown).

The input module 610 receives a graphics object, such as graphics object B, from a computing device (such as the user device 104, the server 108, and the multifunctional device 106) or any other network device. For example, the multifunctional device 106 may scan a physical document to generate an electronic scan image, which may be a raster image sent to the input module 610 directly or via the server 108. Such scan image may either include a graphics object based on pre-processing at the multifunctional device 106 or be converted to a graphics object by the input module 610 using techniques known in the art, related art, or developed later. Other examples may include the received graphics object being drawn by the user based on techniques known in the art, related art, or developed later including template matching.

Once the graphics object is received, the input module 610 temporarily converts the graphics object into a raster image to determine values of various attributes of the received graphics object using any of the techniques known in the art, related art, or developed later. For example, the input module 610 may determine the color of each cell of the graphics object such as the graphics object B, or the color of each pixel associated with transparent cells overlapping an object window such as the object window 704. Based on the determined colors, the input module 610 searches for a locus of cells or pixels having the same color and extending to form an outline, or a part thereof, that defines an enclosed region in the graphics object, where the enclosed region has a color different from the color of the locus. The input module 610 may recognize such locus of cells or pixels as a stroke and the enclosed region as a fill region. In one embodiment, the input module 610 tags each cell or pixel of the fill region with a predefined flag, which may represent any identifier known in the art, related art, or developed later. The predefined flag may indicate a fill region, or any attributes thereof such as color, for a unidirectional strengthening of the stroke, discussed below. Examples of the flag may include, but not limited to, a text, a graphic, a symbol, a numeric or alphanumeric value, a predefined function, and a color, or any combination thereof.

The input module 610 also recognizes the remaining region of the graphics object or a background as an ambient region that communicates with the stroke, or the outline, and is located away from the fill region. Accordingly, the input module 610 determines the stroke color, the fill color, and the background color of the graphics object. When the stroke color differs from the fill color, the input module 610 recognizes the graphics object as a fill object. The determined attribute values such as the stroke color, the fill color, and the background color may be communicated to the network devices or other modules of the AST device 102, or stored in the database 608 by the input module 610. After the received graphics object such as the graphics object B, is recognized, tagged, and its attributes are determined, the input module 610 sends the tagged graphics object and its attributes to the adaptation module 612.

Adaptation Module

The adaptation module 612 receives the graphics object or the fill object, such as the graphics object B, from the input module 610 and fetches values of various attributes of the graphics object from the database 608 or receives these attribute values directly from the input module 610. For example, the adaptation module 612 may receive the color (e.g., the stroke color, fill color, and the background color), and stroke width associated with the graphics object B from the input module 610. The stroke width may be defined in terms of a number of cells or pixels growing adjacently away from each stroke cell or pixel that is in contact with a fill cell or pixel. In one embodiment, the stroke width is adaptively varied based on predefined operation modes, which is configured into the adaptation module 612.

Each operation mode may be bounded by a predefined condition that may select an adapted color for the stroke cells or their adjoining one or more cells to perform different stroke strengthening operations. In one embodiment, the adaptation module 612 is configured with four operation modes, namely, a forced inside fill color (FIFC) mode, a forced stroke color (FSC) mode, a smart stroke color (SSC) mode, and a user mode, for selecting a color to perform the adaptive stroke strengthening. Each mode may be configured to enable a selection of the adapted color being different from the background color with respect to the stroke color.

In the SSC mode, the adaptation module 612 examines the stroke color, the fill color, and the background color for a selection of the adapted color based on two distinct conditions. A first condition refers to the fill color of a fill cell being same as the background color of a linearly adjacent background cell. A second condition refers to the stroke color of a stroke cell being same as the background color of a linearly adjacent background cell. The adaptation module 612 checks the first condition and the second condition for a fill cell, a stroke cell, and a background cell which are linearly adjacent to each other.

Figure 8A:
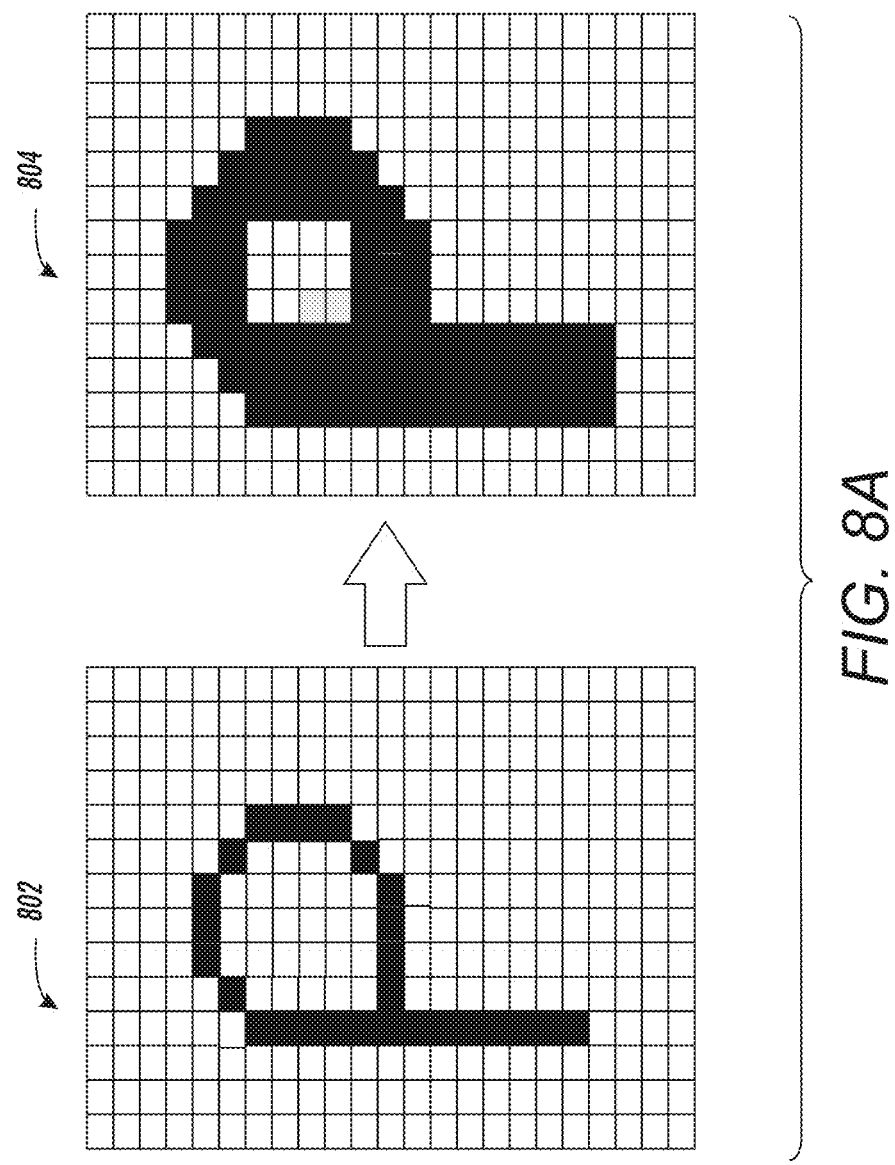

If the first condition is true, the adaptation module 612 may be configured to select a stroke color of the stroke cell as the adapted color. On the other hand, if the second condition is true, the adaptation module 612 may select a fill color of the fill cell as the adapted color. For example, similar to the graphics object B in FIG. 7, the graphics object 802 of FIG. 8A represents a character "P" having a fill color being black and the stroke color being same as the background color, i.e., white color. When such graphics object 802 is examined under the SSC mode, the adaptation module 612 selects the fill color as the adapted color for a predetermined type of adaptive stroke strengthening, discussed later in detail, based on the second condition being determined to be true.

However, if both the first condition and the second condition are false, the adaptation module 612 is configured to select the adapted color based on a predefined rule. In one example of such rule, the adaptation module 612 may select a majority color of the fill as the adapted color. In another example, the adaptation module 612 may select any color available in the fill as the adapted color. One having ordinary skill in the art may contemplate other predefined rules for being implemented by the adaptation module 612.

In the FIFC mode, the adaptation module 612 is configured to select the fill color of the fill cell as the adapted color. In the FSC mode, the adaptation module 612 is configured to select the stroke color of the stroke cell as the adapted color. In the user mode, the adaptation module 612 is configured to select any color inputted by a user as the adapted color. The user may select the adapted color from a color palette having a predefined range of colors configured into or provided by the adaptation module 612. The selected adapted color, the operation mode, and the graphics object, such as the graphics object 802, may be communicated to the AST module 614 and, in some embodiments, additionally stored in the database 608, by the adaptation module 612.

Adaptive Stroke Thickening Module

The AST module 614 receives the selected adapted color, the operation mode selected by a user, and the related graphics object, such as the graphics object 802, from the adaptation module 612 or fetches such data from the database 608. In one embodiment, the AST module 614 is configured to perform stroke thickening, which refers to an increase in the stroke width of the graphics object by N, i.e., a predefined number of cells or pixels, based on the operation mode and the selected adapted color using a predefined stroke thickening technique. In one embodiment, when the operation mode is set to the FSC mode or the user mode, the AST module 614 uses the adapted color to increase the stroke width by a predefined strengthening level. For example, the AST module 614 may grow a contiguous set of one or more cells having the adapted color in the neighborhood of a stroke cell. The contiguous set may be grown in contact with each stroke cell based on the predefined strengthening level.

In another embodiment, when the operation mode is set to the SSC mode, the AST module 614 uses the adapted color to increase the stroke width based on the underlying predefined conditions. For example, when the first condition is true, the AST module 614 may increase the stroke width by growing the cells, i.e., changing the color of cells, linearly adjacent to or adjoining the stroke cell with respect to which the first condition is checked by the adaptation module 612.

However, when the operation mode is either FIFC mode or the SSC mode with the second condition being true, the AST module 614 is configured to substitute the adapted color, e.g., fill color, in place of the stroke color of the stroke cell with respect to which the second condition is true. Additionally, colors of one or more cells adjacent to such stroke cell is changed to the fill color to widen the stroke, i.e., increase the stroke width, of the graphics object by a predetermined strengthening level. As the strengthening level increases, the number of cells whose color is changed to the adapted color are gradually increased by the AST module 614. For example, as illustrated in FIG. 8A, the graphics object 802 represented as a character "P" has a fill color being black and the stroke color being same as the background color, i.e., white color. When such graphics object 802 is examined under the SSC mode, the AST module 614 replaces the stroke color, i.e., the white color, with the fill color, i.e., the black color, to increase the stroke width by strengthening level one, e.g., one strengthening pixel or cell, away and towards the fill region based on the second condition being true to output an enhanced graphics object 804. The stroke width may be increased or strengthened by further strengthening levels in a similar manner. In some embodiments, the strengthening level may be inputted or set within a predefined range by a user.

Figure 8B:
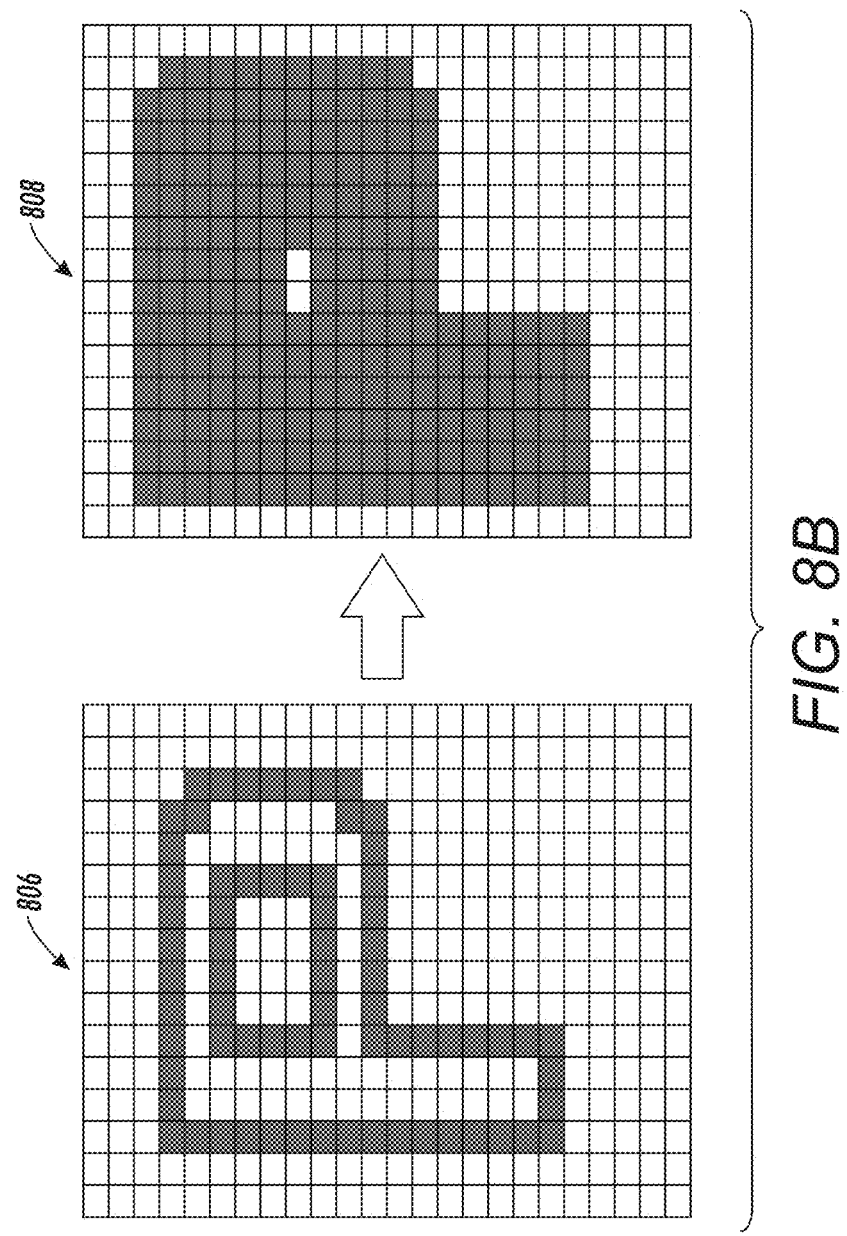

Typically, strengthening cells are grown in contact with each stroke cell both towards and away from the fill for stroke strengthening. Such bi-directional growth in the stroke width may cause content distortion and vary an appearance of the graphics object to adversely impact the sharpness or visibility of the graphics object. Moreover, this issue of appearance variation may uncontrollably proliferate with an increase in the predefined strengthening level as shown in FIG. 8B. The figure illustrates a graphics object 806 that represents a character "P" having a stroke of gray color. The stroke defines a fill region having a white color and the background color is also white. In this example, the AST module 614 transforms the graphics object 806 into a graphics object 808 with the fill region being reduced due to the bi-directional growth of the stroke width and therefore, causing the appearance of the character "P" to adversely vary. To avoid such appearance variation or content distortion, in one embodiment, the AST module 614 may implement a unidirectional stroke thickening technique with or without an option to maneuver the strengthening level. The unidirectional stroke thickening may involve the graphics object 806 being examined for fill cells or pixels that have been tagged, as explained above, by the input module 610 to increase the stroke width only in one direction, which is away from the fill cells or pixels.

In one example, the AST module 614 may be preconfigured or dynamically configured to identify the fill cells or pixels based on the associated tags or flags in the graphics object 810 received from the adaptation module 612, or in some instances, directly from the input module 610, as illustrated in FIG. 8C. Once the fill cells or pixels are identified, the AST module 614 grows a contiguous set of cells or pixels in contact with each stroke cell away from the fill cells based on the predefined strengthening level. As shown in FIG. 8C, the fill cells or pixels of white color in the graphics object 810 represented as a character "P" may be tagged by the input module 610. The AST module 614 identifies the flags (not shown) associated with the fill cells or pixels to increase the stroke width in the unidirectional direction. In one scenario, when the graphics object 810 is examined under the SSC mode and the strengthening level is set to one, the AST module 614 may change the color of either each stroke cell (or pixel) or only one new adjoining cell (or pixel) of each stroke cell (or pixel) with the adapted color, i.e., the black color of the stroke. The new adjoining cell (or pixel) is away from the fill cell or pixel, which is identified based on its associated flag, to output an enhanced graphics object 812 having an increased stroke width without any content loss or change in appearance, i.e., content distortion.

In one embodiment, the AST module 614 is configured to execute the predefined strengthening levels in a predefined order. For example, the AST module 614 may automatically, or manually by a user, activate the first strengthening level initially, then after completion of processing of the first strengthening level, activate the second strengthening level, followed by the third strengthening level. However, in some embodiments, such strengthening levels may be executed in any order by the AST module 614 based on one or more user requests or inputs. Once the stroke strengthening is complete, an enhanced graphics object such as the enhanced graphics object 804 or the enhanced graphics object 812, with a strengthened stroke may be stored in the database 608 and communicated to the output module 616 by the AST module 614.

Output Module

The output module 616 may be in communication with the AST module 614 via a wired or wireless connection to receive the enhanced graphics object from the AST module 614 or the database 608. Examples of the output module 616 may include, but without limitation, a display device such as a touchscreen display, a handling device such as a print head controller; a storage device such as the memory 606; or any computing device such as a laptop, a mobile phone, and a printer. In one embodiment, the output module 616 is configured to store, process, or print the enhanced graphics object. For example, the output module 616 may send an enhanced graphics object such as the graphics object 804 and the graphics object 812 to the multifunctional device 106 including one or more printing or marking engines (not shown) configured to print the graphics object, with or without the adaptive stroke strengthening performed by the AST module 614 in conjunction with the adaptation module 612. The marking engines may be configured for various printing technologies, such as, for example, xerographic, ink-jet (bubble jet), laser, offset, solid-ink, dye sublimation, or the like. One having ordinary skill in the art will understand that these printing technologies are merely exemplary and others may similarly be used.

Figure 9:
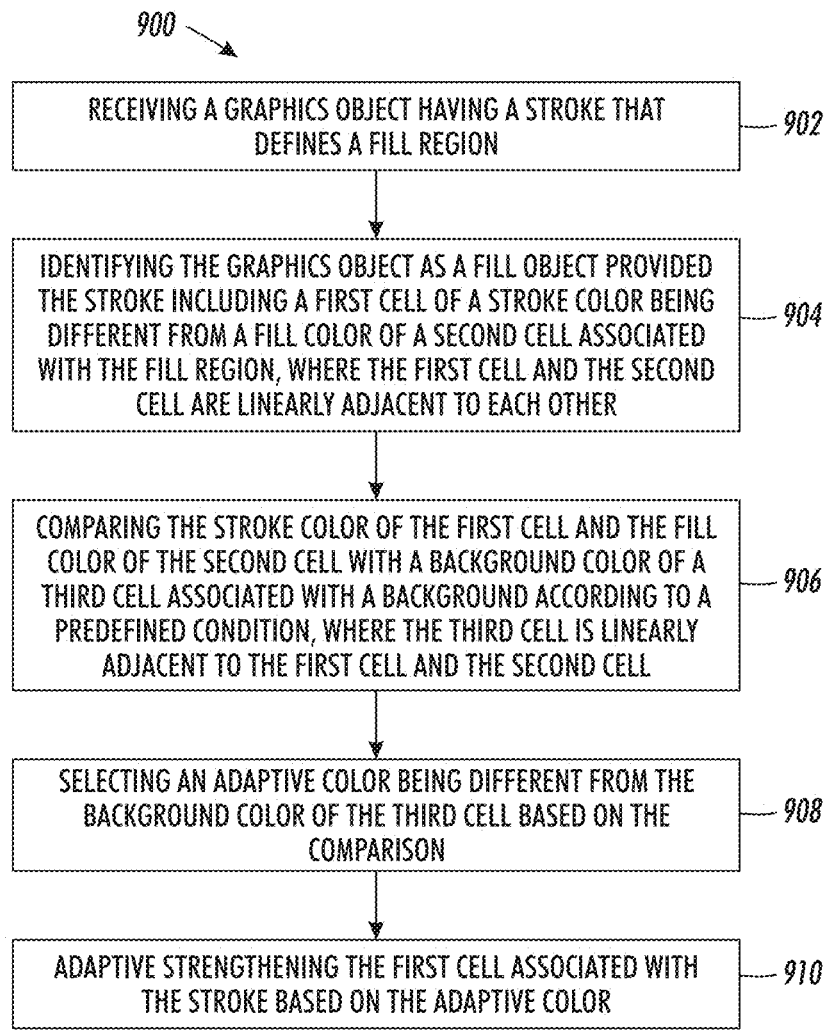
FIG. 9 illustrates an exemplary method being performed by the AST device of FIGS. 1-5, according to an embodiment of the present disclosure.

FIG. 9 illustrates an exemplary method of implementing the AST device 102, according to an embodiment of the present disclosure. The exemplary method 900 may be described in the general context of computer-executable instructions. Generally, computer executable instructions may include routines, programs, objects, components, data structures, procedures, modules, functions, and the like that perform particular functions or implement particular abstract data types. The computer executable instructions may be stored on a computer readable medium, and installed or embedded in an appropriate device for execution.

The order in which the method 900 is described is not intended to be construed as a limitation, and any number of the described method blocks may be combined or otherwise performed in any order to implement the method 900 or an alternate method. Additionally, individual blocks may be deleted from the method without departing from the spirit and scope of the present disclosure described herein. Furthermore, the method 900 may be implemented in any suitable hardware, software, firmware, or combination thereof, that exists in the related art or that is later developed.

The method 900 describes, without limitation, implementation of the exemplary AST device 102. One of skill in the art will understand that the method 900 may be modified appropriately for implementation in various manners without departing from the scope and spirit of the disclosure.

At 902, a graphics object having at least one stroke that defines a fill region is received. The input module 610 receives a graphics object from a computing device such as the user device 104, the server 108, and the multifunctional device 106, or any network device. The graphics object may include a stroke, which defines a fill region. In some embodiments, the stroke may enclose the fill region and may form a part of an outline of the graphics object. The graphics object may be represented within an object window made up of cells such that the stroke being made of stroke cells and the fill region may be made of fill cells. Examples of the object window may include, but not limited to, a virtual or electronic window, an image, a document, and a display screen. In some embodiments, the cells may resemble, correspond to, or associate with pixels such that the stroke cells may resemble stroke pixels and the fill cells may resemble fill pixels. The stroke may be in communication with an ambient region called background within the object window. In some embodiments, the background may be outside the object window relative to the graphics object. The background may be made of background cells, which may resemble background pixels in some embodiments. The graphics object has various attributes such as shape, line style, fill pattern, and color. The stroke cells may have a predefined stroke color, the fill cells may have a fill color, and the background cells may have a background color. One example of the graphics objects is illustrated in FIG. 7 discussed above.

At 904, the received graphics object is identified as a fill object. The input module 610 is further configured to identify the graphics object as a fill object provided a stroke cell has a stroke color being different from a fill color of a fill cell, where the stroke cell is linearly adjacent to or adjoining the fill cell. The input module 610 identifies a stroke as a locus of cells, or pixels, having the same color and extending to form an outline, or a part thereof, which defines an enclosed region or fill. The cells associated with the stroke may be called as stroke cells and those associated with the enclosed region may be called as the fill cells. In one embodiment, the input module 610 tags each fill cell with a predefined flag, which may include, but not limited to, a text, a graphic, a symbol, a numeric or alphanumeric value, a predefined function, and a color, or any combination thereof. The flag represents an identifier and indicates a fill region or any attributes thereof such as color, or both, for enabling a unidirectional strengthening of the stroke. The input module 610 further determines values of various attributes of the fill object. In one embodiment, the input module 610 determines the fill color of the fill cell and the stroke color of the stroke cell. The input module 610 also determines a background color of a background cell, which is linearly adjacent to or adjoining the stroke cell and the fill cell. Further, if the graphics object is identified as the fill object, the input module 610 communicates the determined fill color, the stroke color, and the background color of a set of linearly adjacent or adjoining fill cell, stroke cell, and background cell respectively to the adaptation module 612. In some embodiments, the input module 610 may store the determined fill color, the stroke color, and the background color of the linearly adjacent or adjoining cells in the database 608 for being used by other modules of the AST device 102 or any network device.

At 906, the stroke color of the stroke cell and the fill color of the fill cell are compared with the background color of the background cell according to a predefined condition. The adaptation module 612 receives the fill object and its attribute values from the input module 610 or the database 608. For example, the adaptation module 612 may receive the stroke color, the fill color, and the background color of linearly adjacent or adjoining respective cells. In one embodiment, the adaptation module 612 is configured to examine the attribute values, such as the fill color, the stroke color, and the background color, for comparison based on predefined operation modes, each associated with one or more predefined conditions. The adaptation module 612 may implement various operation modes such as the FIFC mode, the FSC mode, the user mode, and the SSC mode for selection of an adapted color for an adaptive stroke strengthening of the fill object.

In the SSC mode, the adaptation module 612 examines the stroke color, fill color, and the background color for selection of the adapted color based on predefined conditions. A first condition refers to the fill color of a fill cell being same as the background color of a linearly adjacent or adjoining background cell. A second condition refers to the stroke color of a stroke cell being same as the background color of a linearly adjacent or adjoining background cell. The adaptation module 612 checks the first condition and the second condition for a fill cell, a stroke cell, and a background cell which are linearly adjacent to each other. In the FIFC mode, the FSC mode, and the user mode, the adaptation module 612 selects a predefined adapted color irrespective of the comparison. In one embodiment, the SSC mode may be the default mode implemented by the adaptation module 612.

At 908, an adapted color being different from the background color of the background cell is selected based on the comparison. The adaptation module 612 uses the comparison for selection of the adapted color in the SSC mode, where if the first condition is true, the adaptation module 612 is configured to select a stroke color of stroke cell as the adapted color. On the other hand, if the second condition is true, the adaptation module 612 selects the fill color of the fill cell as the adapted color. However, if both the first condition and the second condition are false, the adaptation module 612 is configured to select the adapted color based on a predefined rule. In one example, the adaptation module 612 may select a majority color of the fill as the adapted color. In another example, the adaptation module 612 may select any color available in the fill as the adapted color. One having ordinary skill in the art may contemplate other similar predefined rules for being implemented by the adaptation module 612.

In the FIFC mode, the adaptation module 612 is configured to select the fill color of the fill cell as the adapted color. In the FSC mode, the adaptation module 612 is configured to select the stroke color of the stroke cell as the adapted color. In the user mode, the adaptation module 612 is configured to select any color inputted by a user as the adapted color. The user may select the adapted color from a color palette having a predefined range of colors provided by the adaptation module 612.

At 910, the stroke cell is adaptively strengthened based on the adapted color. The AST module 614 receives the adapted color, the operation mode, and the graphics object from the adaptation module 612. In one embodiment, the AST module 614 strengthens the stroke cell by changing a color of a contiguous set of one or more cells to the adapted color in the neighborhood of the stroke cell. The contiguous set is in contact with the stroke cell. Such strengthening of the stroke cell width by a predefined N number of cells may be performed in predefined strengthening levels using a predefined stroke thickening technique. The AST module 614 gradually increases the number of cells whose color is changed to the adapted color as the strengthening level increases. These strengthening levels may be executed in a predefined order or according to a user request.

In one embodiment, when the operation mode is set to the SSC mode, the AST module 614 uses the adapted color to increase the stroke width based on the underlying predefined conditions. For example, when the first condition is true, the AST module 614 increases the stroke width by growing the cells, i.e., changing the color of cells, adjacent to the stroke cell with respect to which the first condition is checked by the adaptation module 612. However, when the operation mode is either FIFC mode or the SSC mode with the second condition being true, the AST module 614 is configured to substitute the stroke color of the stroke cell, with respect to which the second condition being true, with the adapted color, for example, fill color.

Figure 10:
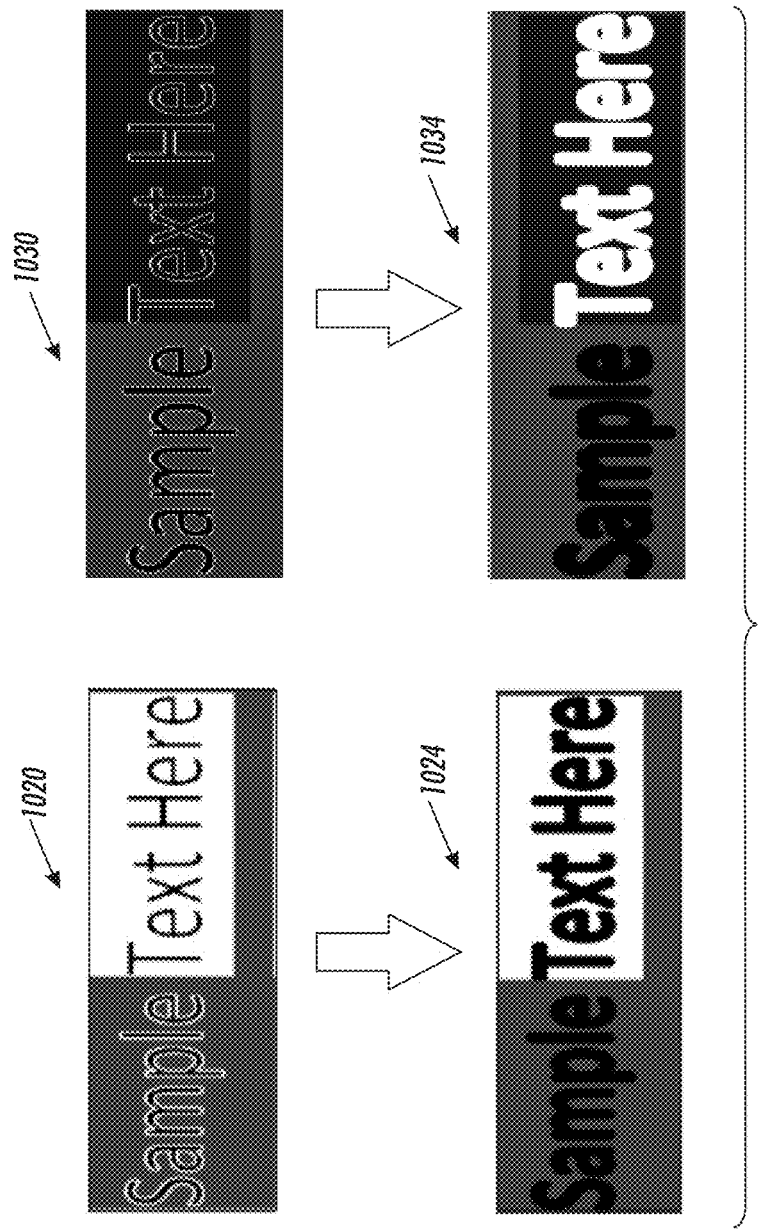
FIG. 10 are schematics of different configurations of graphics objects being enhanced by the AST device of FIGS. 1-5 relative to different backgrounds, according to an embodiment of the present disclosure.

In a first example, as illustrated in FIG. 10, an object window 1020 has a graphics object represented as a text such as "SAMPLE TEXT HERE." The graphics object is identified as a fill object by the adaptation module 612 such that the fill object "SAMPLE TEXT HERE" has a stroke which defines a fill region having a fill color that is different from the stroke color. As shown, the fill object "SAMPLE" has a stroke having white color as the stroke color. The stroke defines a fill region having black color as the fill color. The fill object "SAMPLE" has a background having gray color as the background color. On the other hand, the fill object "TEXT HERE" also has the stroke color being white and the fill color being black; however, the background color is white.

For the sake of brevity, let's assume that the adaptation module 612 implements the SSC mode. Under this mode, since none of the first condition and the second condition are true, the adaptation module 612 selects the adapted color based on a predefined alternative condition. For example, the adaptation module 612 is configured to select the adapted color as the fill color if both the first condition and the second condition are false. Therefore, the adaptation module 612 selects the adapted color being same as the fill color, i.e., black color, for the fill object "SAMPLE". On the other hand, the black color is selected as the adapted color for the fill object "TEXT HERE" as the second condition is determined to be true by the adaptation module 612. Once the different adapted colors are selected for the fill objects "SAMPLE" and "TEXT HERE" due to different respective background colors, the AST module 614 may be activated. The AST module 614 strengthens the strokes of the fill object "SAMPLE" and that of the fill object "TEXT HERE" based on the black color to produce an enhanced graphics object shown within an object window 1024. Within the object window 1024, the AST module 614 has replaced the stroke color, i.e., the white color, with the adapted color, i.e., the black color, to increase the stroke width in a bi-directional manner by a predefined strengthening level, for example, one cell, both away and towards the fill region. However, in one embodiment, the AST module 614 may implement the unidirectional stroke thickening technique for stroke strengthening. Under the unidirectional stroke thickening, the AST module 614 may examine the graphics objects, i.e., the fill objects "SAMPLE" and "TEXT HERE," for fill cells or pixels that have been tagged by the input module 610. Once the tagged fill cells are identified, the AST module 614 bypasses these tagged fill cells to increase the stroke width only in one direction, which is away from the fill cells, for example, in the direction of the background as shown in the illustrated example.

In a second example, FIG. 10 further illustrates an object window 1030 including a similar graphics object represented as a text such as "SAMPLE TEXT HERE." The graphics object is identified as a fill object by the adaptation module 612 such that the fill object "SAMPLE TEXT HERE" has a stroke which defines a fill region having a fill color that is different from the stroke color. As shown, the fill object "SAMPLE" has a stroke having white color as the stroke color. The stroke defines a fill region having black color as the fill color. The fill object "SAMPLE" has a background having gray color as the background color. On the other hand, the fill object "TEXT HERE" also has the stroke color being white and the fill color being black; however, the background color is black.

Under the SSC mode, since the fill color and the background color of the fill object "SAMPLE" in the object window 1030 are same as those in the object window 1020, the adaptation module 612 selects the adapted color same as the fill color, i.e., black color, as none of the first condition and the second condition are true. However, the adaptation module 612 selects the white color as the adapted color for the fill object "TEXT HERE" as the first condition is determined to be true. The AST module 614 then strengthens the strokes of the fill object "SAMPLE" based on the black color and that of the fill object "TEXT HERE" based on the white color to produce an enhanced graphics object shown within an object window 1034.

Within the object window 1034, the AST module 614 has replaced the stroke color of the fill object "SAMPLE" with the black color and the stroke of the fill object "TEXT HERE" with the white color to increase the stroke width in a bi-directional manner by a predefined strengthening level, for example, one cell, both away and towards the fill region. However, in one embodiment, the AST module 614 may implement the unidirectional stroke thickening for stroke strengthening to examine the graphics objects, i.e., the fill objects "SAMPLE" and "TEXT HERE," for fill cells or pixels that have been tagged by the input module 610. Once the tagged fill cells are identified, the AST module 614 bypasses these tagged fill cells to increase the stroke width only in one direction, i.e., away from the fill cells.

In other embodiments such as those under the FSC mode, the AST module 614 may implement the unidirectional stroke strengthening without replacing the stroke color with the adapted color. One skilled in the art shall understand from the reading of this disclosure that the unidirectional stroke strengthening may be implemented independent of the adaptive stroke thickening, which uses the adapted color to change the color of the stroke prior to implementing the stroke thickening. Therefore, when the stroke color is different from the background color, the unidirectional stroke strengthening applied by the AST module 614 achieves the effect of stroke thickening without undesirable artifacts such as content distortion (e.g., unwanted thinning of graphics objects) and content loss (e.g., disappearance of a fill region in graphics objects due to stroke thickening).

The enhanced graphics objects 1024 and 1034 may be communicated to the output module 616 or stored in the database 608. The output module 616 may send the enhanced graphics objects 1024 and 1034 to the multifunctional device 106, which may include one or more printing or marking engines (not shown) to print the graphics object

1024 and 1034, with or without the adaptive stroke strengthening performed by the AST module 614 in conjunction with the adaptation module 612.

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms are deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "receiving" or "determining" or "identifying" "or triggering" or "comparing" or "storing" or "selecting" or "thickening" or "strengthening" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the methods may be implemented in transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A computer-implemented method for adaptive stroke thickening of graphics objects, the computer implemented method comprising:

receiving a graphics object having at least one stroke that defines a fill region, both the at least one stroke and the fill region being represented by a group of cells, wherein the graphics object is represented within an object window made up of a plurality of cells;

identifying the received graphics object as a fill object based on the at least one stroke including a first cell of a stroke color being different from a fill color of a second cell associated with the fill region, wherein the first cell and the second cell belong to the group of cells and are linearly adjacent to each other;

comparing the stroke color of the first cell and the fill color of the second cell with a background color of a third cell associated with a background according to at least one predefined condition, the third cell belongs to the plurality of cells based on the background being a part of the object window, wherein the third cell is linearly adjacent to the first cell and the second cell;

selecting an adapted color being different from the background color of the third cell based on the comparison; and adaptively strengthening the first cell associated with the at least one stroke based on the adapted color.

2. The computer-implemented method according to claim 1, wherein the fill region is enclosed by the at least one stroke.

3. The computer-implemented method according to claim 1, wherein the at least one predefined condition includes the fill color being same as the background color.

4. The computer-implemented method according to claim 3, wherein the adapted color is selected to be same as the stroke color provided the at least one predefined condition is true.

5. The computer-implemented method according to claim 1, wherein the predefined condition includes the stroke color being same as the background color.

6. The computer-implemented method according to claim 5, wherein the adapted color is selected to be same as the fill color provided the at least one predefined condition is true.

7. The computer-implemented method according to claim 6, wherein the step of strengthening further comprises replacing the stroke color of the first cell by the adapted color.

8. The computer-implemented method according to claim 1, wherein the first cell is strengthened by changing a color of a contiguous set of one or more cells to the adapted color in the neighborhood of the first cell, wherein the contiguous set is in contact with the first cell.

9. The computer-implemented method according to claim 1, wherein the adapted color is forcefully selected to be same as the fill color irrespective of the comparison.

10. The computer-implemented method according to claim 1, wherein the adapted color is forcefully selected to be same as the stroke color irrespective of the comparison.

11. The computer-implemented method according to claim 1, wherein the adapted color is selected by a user from a predefined range of colors.

12. The computer-implemented method according to claim 1, wherein at least one of: the fill region and the at least one stroke is two-pixel wide or less.

13. The computer-implemented method according to claim 1, wherein the object window is at least one of an image, a document, a virtual window, and a display screen.

14. The computer-implemented method according to claim 1, wherein each cell among the group of cells and the plurality of cells resembles a pixel such that the first cell resembles a first pixel, the second cell resembles a second pixel, and the third cell resembles a third pixel.

15. A computer-implemented method for improving the quality of graphics objects, the computer-implemented method comprising:

receiving a graphics object being defined by at least one stroke and a fill region relative to a background region;

identifying a stroke color associated with the at least one stroke, a fill color associated with the fill region, and a background color associated with the background region;

triggering an operational mode selected from a predefined set of modes including at least one of a forced inside fill color (FIFC) mode, a forced stroke color (FSC) mode, a smart stroke color (SSC) mode, and a user mode;

selecting an adapted color to strengthen the at least one stroke based on the triggered operational mode, wherein:

if the FIFC mode is triggered, the adapted color is selected to be same as the fill color;

if the FSC mode is triggered, the adapted color is selected to be same as the stroke color;

if the SSC mode is triggered, the adapted color is selected to be same as either the stroke color if the fill color is same as the background color or the fill color if the stroke color is same as the background color; and if the user mode is triggered, the adapted color is selected by a user from a predefined range of colors; and adaptively strengthening the at least one stroke based on the adapted color.

16. The computer-implemented method according to claim 15, wherein the fill region is enclosed by the at least one stroke.

17. The computer-implemented method according to claim 15, wherein the graphics object is represented within an object window, which is at least one of an image, a document, an virtual window, and a display screen.

18. The computer-implemented method according to claim 17, wherein the background region is a part of the object window in which the graphics object is represented.

19. The computer-implemented method according to claim 15, wherein the operational mode is selected by a user.

20. The computer-implemented method according to claim 15, wherein the step of strengthening further comprises replacing the stroke color with the adapted color if the FIFC mode is triggered or the stroke color is same as the background color in the SSC mode.

21. The computer-implemented method according to claim 15, wherein at least one of: the fill region and the at least one stroke is two-pixel wide or less.

22. A device for adaptive stroke thickening of graphics objects, the device comprising:

an input module on a computer having a memory and a processor configured to:

receive a graphics object having at least one stroke that defines a fill region, both the at least one stroke and the fill region being represented by a group of cells, wherein the graphics object is represented within an object window made up of a plurality of cells; and identify the received graphics object as a fill object based on the at least one stroke including a first cell of a stroke color being different from a fill color of a second cell associated with the fill region, wherein the first cell and the second cell belong to the group of cells and are linearly adjacent to each other;

an adaptation module on the computer configured to:

compare the stroke color of the first cell and the fill color of the second cell with a background color of a third cell associated with a background according to at least one predefined condition, the third cell belongs to the plurality of cells based on the background being a part of the object window, wherein the third cell is linearly adjacent to the first cell and the second cell; and select an adapted color being different from the background color of the third cell based on the comparison; and a stroke strengthening module on the computer configured to:

adaptively strengthen the first cell associated with the at least one stroke based on the adapted color.

23. The device according to claim 22, wherein the fill region is enclosed by the at least one stroke.

24. The device according to claim 22, wherein the at least one predefined condition includes the fill color being same as the background color.

25. The device according to claim 24, wherein the adapted color is selected to be same as the stroke color provided the at least one predefined condition is true.

26. The device according to claim 22, wherein the predefined condition includes the stroke color being same as the background color.

27. The device according to claim 26, wherein the adapted color is selected to be same as the fill color provided the at least one predefined condition is true.

28. The device according to claim 27, wherein the stroke strengthening module is further configured to replace the stroke color of the first cell by the adapted color.

29. The device according to claim 22, wherein the stroke strengthening module is further configured to strengthen the first cell by changing a color of a contiguous set of one or more cells to the adapted color in the neighborhood of the first cell, wherein the contiguous set is in contact with the first cell.

30. The device according to claim 22, wherein the adapted color is forcefully selected to be same as the fill color irrespective of the comparison.

31. The device according to claim 22, wherein the adapted color is forcefully selected to be same as the stroke color irrespective of the comparison.

32. The device according to claim 22, wherein the adapted color is selected by a user from a predefined range of colors.

33. The device according to claim 22, wherein at least one of the fill region and the at least one stroke is two-pixel wide or less.

34. The device according to claim 22, wherein the object window is at least one of an image, a document, a virtual window, and a display screen.

35. The device according to claim 22, wherein each cell among the group of cells and the plurality of cells resembles a pixel such that the first cell resembles a first pixel, the second cell resembles a second pixel, and the third cell resembles a third pixel.

36. A non-transitory computer-readable medium comprising computer-executable instructions for adaptive stroke thickening of graphics objects, the non-transitory computer-readable medium comprising instructions for:

receiving a graphics object having at least one stroke that defines a fill region, both the at least one stroke and the fill region being represented by a group of cells, wherein the graphics object is represented within an object window made up of a plurality of cells;

identifying the received graphics object as a fill object based on the at least one stroke including a first cell of a stroke color being different from a fill color of a second cell associated with the fill region, wherein the first cell and the second cell belong to the group of cells and are linearly adjacent to each other;

comparing the stroke color of the first cell and the fill color of the second cell with a background color of a third cell associated with a background according to at least one predefined condition, the third cell belongs to the plurality of cells based on the background being a part of the object window, wherein the third cell is linearly adjacent to the first cell and the second cell;

selecting an adapted color being different from the background color of the third cell based on the comparison; and adaptively strengthening the first cell associated with the at least one stroke based on the adapted color.

37. The non-transitory computer-readable medium according to claim 36, wherein the fill region is enclosed by the at least one stroke.

38. The non-transitory computer-readable medium according to claim 36, wherein the at least one predefined condition includes the fill color being same as the background color.

39. The non-transitory computer-readable medium according to claim 38, wherein the adapted color is selected to be same as the stroke color provided the at least one predefined condition is true.

40. The non-transitory computer-readable medium according to claim 36, wherein the predefined condition includes the stroke color being same as the background color.

41. The non-transitory computer-readable medium according to claim 40, wherein the adapted color is selected to be same as the fill color provided the at least one predefined condition is true.

42. The non-transitory computer-readable medium according to claim 41, wherein the step of strengthening further comprises replacing the stroke color of the first cell by the adapted color.

43. The non-transitory computer-readable medium according to claim 36, wherein the step of strengthening further comprises strengthening the first cell by changing a color of a contiguous set of one or more cells to the adapted color in the neighborhood of the first cell, wherein the contiguous set is in contact with the first cell.

44. The non-transitory computer-readable medium according to claim 36, wherein the adapted color is forcefully selected to be same as the fill color irrespective of the comparison.

45. The non-transitory computer-readable medium according to claim 36, wherein the adapted color is forcefully selected to be same as the stroke color irrespective of the comparison.

46. The non-transitory computer-readable medium according to claim 36, wherein the adapted color is selected by a user from a predefined range of colors.

47. The non-transitory computer-readable medium according to claim 36, wherein at least one of the fill region and the at least one stroke is two-pixel wide or less.

48. The non-transitory computer-readable medium of claim 36, wherein the object window is at least one of an image, a document, a virtual window, and a display screen.

49. The non-transitory computer-readable medium according to claim 36, wherein each cell among the group of cells and the plurality of cells resembles a pixel such that the first cell resembles a first pixel, the second cell resembles a second pixel, and the third cell resembles a third pixel.

* * * * *